United States Patent
Wheeler et al.

(10) Patent No.: US 9,291,045 B2
(45) Date of Patent: Mar. 22, 2016

(54) METHOD OF FRACTURING USING ULTRA LIGHTWEIGHT PROPPANT SUSPENSIONS AND GASEOUS STREAMS

(75) Inventors: Richard S. Wheeler, Crosby, TX (US); Chandler C. Newhall, Brighton, CO (US); Roger R. Myers, Cranberry Township, PA (US); Brian Ward, The Woodlands, TX (US); Brian B. Beall, Spring, TX (US); Harold D. Brannon, Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 873 days.

(21) Appl. No.: 13/367,106

(22) Filed: Feb. 6, 2012

(65) Prior Publication Data

US 2013/0032346 A1    Feb. 7, 2013

Related U.S. Application Data

(63) Continuation-in-part of application No. 13/073,886, filed on Mar. 28, 2011, now Pat. No. 8,109,336, which is a continuation of application No. 12/180,219, filed on Jul. 25, 2008, now Pat. No. 7,913,762.

(51) Int. Cl.
| | |
|---|---|
| *E21B 43/267* | (2006.01) |
| *C09K 8/70* | (2006.01) |
| *C09K 8/80* | (2006.01) |

(52) U.S. Cl.
CPC .............. *E21B 43/267* (2013.01); *C09K 8/703* (2013.01); *C09K 8/80* (2013.01); *C09K 2208/30* (2013.01)

(58) Field of Classification Search
None
See application file for complete search history.

(56) References Cited

U.S. PATENT DOCUMENTS

| | | | | |
|---|---|---|---|---|
| 2,598,980 | A | * 6/1952 | Denning | ................. C04B 28/30 |
| | | | | 106/646 |
| 3,384,176 | A | 5/1968 | Huitt | |
| 3,937,283 | A | 2/1976 | Blauer et al. | |
| 4,212,354 | A | 7/1980 | Guinn | |
| 4,354,552 | A | 10/1982 | Zingg | |
| 4,480,696 | A | * 11/1984 | Almond | ................. C09K 8/703 |
| | | | | 166/308.6 |
| 4,519,455 | A | * 5/1985 | Holtmyer | ................. E21B 43/26 |
| | | | | 166/305.1 |

(Continued)

FOREIGN PATENT DOCUMENTS

WO      2013119507 A1    8/2013

OTHER PUBLICATIONS

Reidenbach, et al.; "Rheological Study of Foam Fracturing Fluids Using Nitrogen and Carbon Dioxide," Jan. 1986; Society of Petroleum Engineers; SPE Production Engineering; pp. 31-41.*

(Continued)

*Primary Examiner* — Angela M DiTrani
(74) *Attorney, Agent, or Firm* — John Wilson Jones

(57) ABSTRACT

In a method of hydraulically fracturing a hydrocarbon-bearing subterranean formation, a proppant stage is introduced into the fracture which contains a gaseous fluid and an ultra lightweight proppant suspended in a viscosified aqueous fluid. The gaseous fluid of the proppant stage contains at least about 90 volume percent of the combination of gaseous fluid and aqueous fluid. A pad fluid may first be introduced into the formation, the pad fluid containing a gaseous fluid and, optionally, an aqueous fluid. The gaseous fluid of the pad fluid mixture typically contains at least 70 volume percent of the mixture.

26 Claims, 2 Drawing Sheets

(56) References Cited

U.S. PATENT DOCUMENTS

| | | | |
|---|---|---|---|
| 4,554,082 A * | 11/1985 | Holtmyer | C09K 8/703 166/308.6 |
| 4,627,495 A * | 12/1986 | Harris | E21B 43/267 166/280.1 |
| 4,730,676 A * | 3/1988 | Luers | B01F 3/04446 166/309 |
| 4,830,794 A | 5/1989 | Edgley et al. | |
| 5,002,125 A | 3/1991 | Phillips et al. | |
| 5,069,283 A | 12/1991 | Mack | |
| 5,258,137 A * | 11/1993 | Bonekamp et al. | 516/11 |
| 5,305,832 A | 4/1994 | Gupta et al. | |
| 5,424,285 A | 6/1995 | Stacy et al. | |
| 5,495,891 A * | 3/1996 | Sydansk | C09K 8/38 166/295 |
| 5,515,920 A | 5/1996 | Luk et al. | |
| 5,558,160 A | 9/1996 | Tudor | |
| 6,017,855 A | 1/2000 | Dawson et al. | |
| 6,059,034 A | 5/2000 | Rickards et al. | |
| 6,330,916 B1 | 12/2001 | Rickards et al. | |
| 6,364,018 B1 | 4/2002 | Brannon et al. | |
| 6,410,489 B1 | 6/2002 | Zhang et al. | |
| 6,439,309 B1 | 8/2002 | Matherly et al. | |
| 6,509,300 B1 | 1/2003 | Gupta | |
| 6,729,409 B1 | 5/2004 | Gupta et al. | |
| 6,749,025 B1 | 6/2004 | Brannon et al. | |
| 6,772,838 B2 | 8/2004 | Dawson et al. | |
| 6,875,728 B2 | 4/2005 | Gupta et al. | |
| 6,966,379 B2 | 11/2005 | Chatterji et al. | |
| 7,049,436 B2 | 5/2006 | Gupta et al. | |
| 7,201,227 B2 | 4/2007 | Gupta et al. | |
| 7,210,528 B1 * | 5/2007 | Brannon et al. | 507/140 |
| 7,261,158 B2 * | 8/2007 | Middaugh et al. | 166/280.2 |
| 7,426,961 B2 | 9/2008 | Stephenson et al. | |
| 7,726,399 B2 | 6/2010 | Brannon et al. | |
| 7,726,404 B2 | 6/2010 | Kubala et al. | |
| 7,735,551 B2 | 6/2010 | Vozniak et al. | |
| 7,913,762 B2 * | 3/2011 | Wheeler et al. | 166/308.2 |
| 8,109,336 B2 * | 2/2012 | Wheeler et al. | 166/308.2 |
| 8,193,127 B2 | 6/2012 | Thieme et al. | |
| 8,524,639 B2 * | 9/2013 | Falana | C09K 8/38 166/308.6 |
| 2004/0040708 A1 * | 3/2004 | Stephenson et al. | 166/280.1 |
| 2005/0028979 A1 | 2/2005 | Brannon et al. | |
| 2007/0087941 A1 * | 4/2007 | Cawiezel | 507/204 |
| 2008/0217012 A1 | 9/2008 | Delorey et al. | |

OTHER PUBLICATIONS

Phillip C. Harris et al.; "High-Quyality Foam Fracturing Fluids", SPE Gas Technology Symposium, Apr. 28-May 1, 1996, Calgary, Alberta Canada, Apr. 28, 1996, pp. 265-273, XP055058748, DOI: 10.2118/35600-MS, ISBN: 978-1-55-563428-5 the whole document.

* cited by examiner

METHOD OF FRACTURING USING ULTRA LIGHTWEIGHT PROPPANT SUSPENSIONS AND GASEOUS STREAMS

This application is a continuation-in-part application of U.S. patent application Ser. No. 13/073,886, filed on Mar. 28, 2011 now U.S. Pat. No. 8,109,336 which is a continuation application of U.S. patent application Ser. No. 12/180,219, filed on Jul. 25, 2008, now U.S. Pat. No. 7,913,762.

FIELD OF THE INVENTION

The invention relates to a method of hydraulic fracturing a subterranean formation by introducing into the formation a stable foam as proppant stage containing a gaseous fluid and an ultra lightweight (ULW) proppant suspended in a viscosified or gelled aqueous fluid.

BACKGROUND OF THE INVENTION

A common method of increasing productivity of a hydrocarbon-bearing formation penetrated by a wellbore is to subject the formation to stimulation techniques, such as hydraulic fracturing. In hydraulic fracturing, a liquid, gas or two-phase fluid, generally referred to as a fracturing fluid, is introduced into the formation. The fracturing fluid, typically water or oil-based, is introduced into the wellbore penetrating the formation at a sufficient pressure and flow rate to create fractures in the subterranean formation. A proppant is introduced into the fractures to keep the fractures open. The propped fracture provides larger flow channels through which an increased quantity of a hydrocarbon may flow, thereby increasing the productive capability of the well.

Recently, ultra lightweight (ULW) particulates have been reported for use as proppants. The requisite fluid velocity to maintain proppant transport within the fracture is reduced by the use of ULW proppants. In light of reduced fluid velocity, a greater amount of the created fracture area may be propped. Exemplary of such ULW proppants are those set forth in U.S. Patent Publication No 2008/0087429 A1, herein incorporated by reference.

Many times, fracturing proceeds by first introducing into the formation a "pad" or "spearhead" fluid. Pad or spearhead fluids are fracturing fluids used to initiate fractures and are typically free of proppant. They normally exhibit relatively low viscosity. Following the initiation of the fracture, fracturing fluid containing proppant is then introduced into the formation.

Fracturing fluids which are predominately liquid typically exhibit poor transport properties. High pumping rates are normally required in order to impart a sufficient velocity for placement of the proppant in the fracture. In such treatments, the proppant tends to settle, forming a 'proppant bank', as the linear slurry velocity falls as a function of the distance from the wellbore. This effect is further believed to result in reduced stimulation efficiency as the effective propped length is relatively short.

Further complications arise from the use of liquid fracturing fluids because of the need to recover the fracturing fluid. Such fracturing fluids typically contain components which are damaging to the environment and/or affect the production of oil and/or gas from the reservoir. For instance, water soluble polymers, such as guar gum or a derivative thereof, are often used in fracturing fluids to provide the requisite flow characteristics to the fluid and to suspend proppant particulates. When pressure on the fracturing fluid is released and the fracture closes around the proppant, water is forced out and the water-soluble polymer forms a filter cake. This filter cake can prevent oil or gas flow if it is not removed. Further, emulsions may be generated from fracturing fluids which impede flow of produced gas and/or oil.

The recovery of fracturing fluids and the removal of filter cakes is normally accomplished by reducing the viscosity of the fluid with a breaker such that the fracturing fluid flows naturally from the formation under the influence of hydrostatic pressure. Historically, the application of breakers in fracturing fluids at elevated temperatures, i.e., above about 120-130° F., has been a compromise between maintaining proppant transport and achieving the desired fracture conductivity, measured in terms of effective propped fracture length. Conventional oxidative breakers react rapidly at elevated temperatures, potentially leading to catastrophic loss of proppant transport. Encapsulated oxidative breakers have experienced limited utility at elevated temperatures due to a tendency to release prematurely or to have been rendered ineffective through payload self-degradation prior to release.

Alternative fracturing treatments have been explored by incorporating gaseous materials into fracturing fluids in order to form a gas phase at the wellhead or at the formation being fractured or both. In "foam fracturing", a foam is generated of a desired Mitchell quality which is then introduced through the wellbore into the formation. For instance, U.S. Pat. No. 3,937,283 discloses a hydraulic fracturing process employing a foam formed of a gas (such as nitrogen, carbon dioxide, air or a hydrocarbon gas) and a liquid (such as water or an oil base liquid). The foam is characterized as having a foam, or Mitchell, quality within the range of 52.4% to 99.99% and preferably between the ranges of 60% to 85%. The pressure at which the foam is pumped into the well is such that a fracture of the hydrocarbon-bearing formation is created. The foam easily exits the well when pressure is released from the wellhead. The reduction in pressure causes the foam to expand.

It is known that in order to successfully carry proppant particulates into a formation, the foamed fluid must exhibit a fine, uniform texture rather than a coarse texture. Over a foam quality of 85%, foamed fluids have been known to exhibit a coarse structure. Coarse textures destabilize the foam, causing the foam to disintegrate and break apart. In addition to increasing stability of the foam, a fine texture is also known to affect viscosity of the foam. With fine textured foams defined by bubbles of small diameter, interaction amongst the bubbles increases which, in turn, increases the viscosity of the fluid.

Further, conventional fracturing operations, including those wherein a gaseous material is incorporated into the fracturing fluid, have been found to be inappropriate for the creation of partial monolayer fractures. Partial monolayer fractures are created by a proppant pack having proppant particulates widely spaced from each other, the proppant pack exhibiting the requisite strength to hold fractures open and thus allow the production of hydrocarbons from the formation.

The efficiency of a partial monolayer fracture is dependent on fracture porosity and conductivity once the fracturing operation is stopped and production commences. Fracture porosity is dependent upon the area concentration of the proppant placed, the proppant size, and mechanical properties, e.g., modulus, of the proppant. It is important that proppant packs forming partial monolayer fractures exhibit high porosity. The high conductivity of the created fractures is attributable to the ability of produced fluids to flow around the widely spaced proppant particulates instead of being confined to the relatively small interstitial spaces evidenced in the packed proppant bed.

Alternative hydraulic fracturing methodologies have been sought which provide increased conductive fracture areas and increased effective propped fracture lengths. Such alternative methodologies need to render improved stimulation efficiency and well productivity and provide a means to create partial monolayer fractures. In addition, such methodologies need to minimize or eliminate the reservoir damage evidenced from the use of liquid fracturing fluids.

SUMMARY OF THE INVENTION

The invention relates to a method of hydraulically fracturing a hydrocarbon-bearing subterranean formation by introducing into the fracture at least one proppant stage which contains a gaseous fluid and an ultra lightweight (ULW) proppant suspended in a viscosified or surfactant gelled aqueous fluid. The gaseous fluid of the proppant stage contains at least about 85 volume percent of the combination of gaseous fluid and aqueous fluid. The ULW proppant has an apparent specific gravity less than or equal to 2.45.

In an embodiment, the proppant stage is a fine textured foam wherein the diameter of at least 70% gas volume of the bubbles constituting the fine textured foam is less than or equal to 0.18 mm. Such foams are highly stable even when the gaseous fluid of the proppant stage is well over 85 volume percent.

The ULW proppant is suspended in the viscosified or surfactant gelled aqueous fluid prior to being admixed with the gaseous fluid. The amount of proppant suspended in the surfactant gelled aqueous system or viscosified aqueous fluid is that amount sufficient to create a partial monolayer in the fracture.

The pumping of the proppant stage may be preceded by introduction of a pad fluid. The pad fluid contains a gaseous fluid and is introduced into the formation at a pressure sufficient to initiate a fracture. The pad fluid may further contain an aqueous fluid. Typically, the gaseous fluid of the pad fluid mixture comprises at least 70 volume percent of the pad fluid mixture. The pad fluid may further contain a proppant, preferably an ULW proppant having an apparent specific gravity less than or equal to 2.25.

The disclosed methodology improves proppant placement and conductive fracture area, while minimizing fracture conductivity damage.

DETAILED DESCRIPTION OF THE PREFERRED EMBODIMENTS

Figure 1:
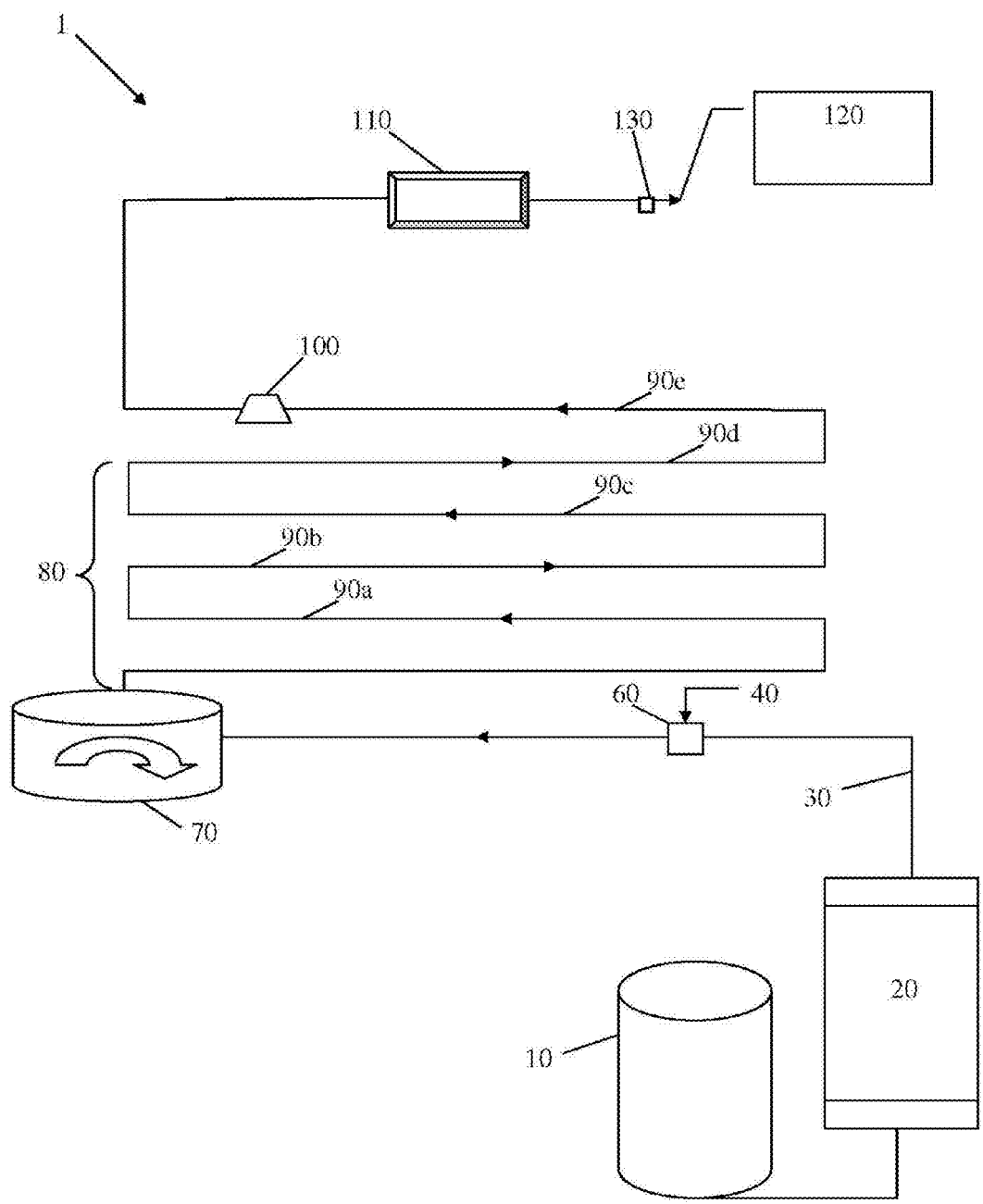
FIG. 1 is a foam flow loop used in the measurement of the diameter of the bubbles of the fine textured foam described herein.

The fracturing method described herein consists of introducing into the fracture within a formation a proppant stage containing a gaseous fluid and a viscosified aqueous fluid in which the proppant is suspended. The proppant stage is created by the mixing of the gaseous fluid and the viscosified aqueous fluid containing suspended proppant at the wellhead.

The proppant stage may be characterized as a fine textured foam wherein the diameter of at least 70% gas volume of the bubbles constituting the fine textured foam is less than or equal to 0.18 mm. Typically, the diameter of at least 70% gas volume of the bubbles is between from about 0.01 mm to about 0.10 mm. In a preferred embodiment, at least about 80% gas volume of the bubbles constituting the fine textured foam have a diameter which is less than or equal to 0.18 mm, typically between from about 0.01 mm to about 0.10 mm. In a still preferred embodiment, at least about 90% gas volume of the bubbles constituting the fine textured foam have a diameter which is less than or equal to 0.18 mm, typically between from about 0.01 mm to about 0.10 mm.

The amount of gaseous fluid contained in the proppant stage is at least about 85 volume percent, i.e., at least about 85 volume percent of the combination of gaseous fluid and aqueous fluid in the proppant stage is the gaseous fluid. Typically, the amount of gaseous fluid in the proppant stage is greater than or equal to 90 volume percent, preferably up to 95% foam quality. Usually, at least about 95 percent of the proppant particulates in the proppant stage are not in contact with other proppant particulates in the created fracture.

The described method of fracturing creates a large conductive fracture area in the formation with a minimal amount of liquid fluid. The propped fracture area exhibits high conductivity using a minimal volume of liquid fluid in the proppant stage. As a result, there is minimal, if any, damage to conductivity. Since the proppant stage is composed predominately of gas, the amount of fracturing fluid that must be recovered is minimal. Further, damage to the reservoir, often affiliated with the use of liquid fracturing fluids, is minimized or eliminated. For instance, since the amount of liquid in the proppant stage fluid is minimized, damage caused by polymers, emulsions and water blocks which routinely results with liquid fracturing fluids is dramatically reduced, if not eliminated. Environmental impact from the fracturing method disclosed herein is thereby reduced.

The disclosed methodology further provides easier movement of reservoir fluids (gas and/or oil), especially in low pressure or under-pressured reservoirs. When liquid fracturing fluids are employed, the liquid column in the casing and wellbore imparts a hydrostatic pressure on the reservoir, necessitating that the reservoir has sufficient greater pressure than the applied hydrostatic pressure to push the fracturing fluid out of the wellbore. In light of the low amount of liquid used in the inventive fracturing fluid, the amount of hydrostatic pressure to be overcome, if any, to allow flow of oil or gas out of the reservoir is minimized or eliminated. In addition, since the disclosed methodology uses less liquid and proppant in the fracturing fluid than conventional fracturing processes, equipment demands are decreased and operational costs are reduced.

Further, the method of fracturing a hydrocarbon-bearing subterranean formation, as defined by the invention, is capable of creating a partial monolayer of proppant in the fracture upon closure of the fracture. Properly placed, the partial monolayer provides the most efficient conductivity for the amount of proppant employed. The partial monolayer is created by the use of a small amount of aqueous fluid in the proppant stage; the fluid in the proppant stage being mostly an inert gas, such as nitrogen. Proppants in partial monolayers further are generally less susceptible to flowback in light of their improved confinement. Further, produced fluids flowing through a partial monolayer have a reduced tendency of proppant flowback during production of oil and/or gas from the well. Fluid recovery after treatment is thereby greatly enhanced for high well productivity.

In the method defined herein, a ULW proppant is first slurried in an aqueous fluid. A slurry concentrate is preferred since it makes the operational procedure more logistically acceptable as a greater amount of proppant per given volume is made available on-site and in the vicinity of the blender/ mixer. The ULW proppant is then suspended in a viscosified aqueous fluid prior to being admixed with the gaseous fluid. To do so, the ULW proppant slurry was introduced to the viscosified fluid at a temperature of less than 100° F. and agitated for about 30 minutes.

The amount of proppant suspended in the viscosified aqueous fluid is that amount sufficient to create a partial monolayer in the fracture. Prior to being suspended in the viscosified aqueous fluid, the concentration of ULW proppant in the aqueous fluid is normally between from about 2 to about 8 pounds per gallon of liquid (ppa).

The slurry, containing the ULW proppant, is introduced into a blender or mixer and a viscosifying agent is then added. The admixture is stirred until the proppant becomes suspended in the aqueous fluid. Vigorous agitation may be required to prevent gravity segregation of the proppant while the viscosifying agent is being introduced. The suspension may be batch-mixed or made on-the-fly. At least one high pressure pump is used to inject the proppant slurry into the wellhead.

The viscosifying agent may be a synthetic or natural polymer.

In a preferred embodiment, the viscosifying agent is a viscoelastic surfactant. Upon agitation, the ULW proppant becomes suspended in the viscoelastic surfactant as the viscoelastic surfactant commences gelation.

The amount of viscosifying agent added to the aqueous fluid containing the proppant is that amount sufficient to suspend the proppant in the resulting medium. Typically, the amount of viscosifying agent added to the aqueous fluid is from about 1 to about 15 gallons per thousand (gpt) of aqueous fluid.

Typically, the weight percent of proppant in the suspension is between from about 6 to about 55 weight percent, preferably between from about 19 to about 49 weight percent. Further, the requisite amount of proppant may be adjusted by varying the rate of gas introduced into the operation mixer/blender with the aqueous fluid or by varying the rate of proppant slurry into the mixer/blender. Typical downhole proppant concentrations are approximately 0.05 per gallon (ppg) of fluid in the proppant stage (including the gaseous phase) at downhole conditions of pressure and temperature and may increase to 0.5 ppg. The low concentration of proppant facilitates the ability to attain a very dispersed proppant distribution upon fracture closure and thus to obtain the desired partial monolayer. The injection rate of proppant slurry into the wellhead may be adjusted to obtain the desire downhole proppant concentration.

The fluid containing the suspended proppant is added to the gaseous stream. Typically, the gaseous stream is introduced directly at the wellhead and is concurrently admixed with the aqueous proppant suspension at the wellhead.

Suitable synthetic or natural polymers are those hydratable polymers which contain one or more functional groups, such as a hydroxyl, carboxyl, sulfate, sulfonate, amino or amido group. Preferred synthetic and natural polymers include polysaccharides, polyvinyl alcohols, polyacrylates (including the (meth)acrylates), polypyrrolidones, polyacrylamides (including (meth)acrylamides) as well as 2-acrylamido-2-methylpropane sulfonate and mixtures thereof.

Other suitable polysaccharides and derivatives are those which contain one or more monosaccharide units of galactose, fructose, mannose, glucoside, glucose, xylose, arabinose, glucuronic acid and pyranosyl sulfate. These include guar gums and derivatives thereof, locust bean gum, tara, xanthan, succinoglycan, scleroglucan and carrageenan.

Preferred viscosifying polymers may include crosslinkable polysaccharides, such as guar gums and derivatives, cellulose, starch, and galactomannan gums. Cellulose and cellulose derivatives include alkylcellulose, hydroxyalkyl cellulose or alkylhydroxyalkyl cellulose, carboxyalkyl cellulose derivatives such as methyl cellulose, hydroxyethyl cellulose, hydroxypropyl cellulose, hydroxybutyl cellulose, hydroxyethylmethyl cellulose, hydroxypropylmethyl cellulose, hydroxybutylmethyl cellulose, methylhydroxyethyl cellulose, methylhydroxypropyl cellulose, ethylhydroxyethyl cellulose, carboxyethylcellulose, carboxymethylcellulose and carboxymethylhydroxyethyl cellulose.

Specific examples of polysaccharides useful with the present invention include, but are not limited to, guar gum, hydroxypropyl guar, carboxymethylhydroxypropyl guar and known derivatives of these gums.

Suitable surfactant based gels for use in practicing the invention may be prepared from viscoelastic surfactants containing an anionic surfactant and a cationic surfactant. A preferred viscoelastic surfactant is the combination of sodium xylene sulfonate, as anionic surfactant, and N,N,N-trimethyl-1-octadecammonium chloride, as cationic surfactant. Such viscoelastic surfactants are set forth in U.S. Pat. No. 6,468,945, herein incorporated by reference. The volume ratio of anionic surfactant:cationic surfactant is from about 1:4 to about 4:1.

Other suitable surfactant based gelled systems are those fluids which contain a $C_{10}$ to $C_{24}$ alkyl trialkyl quaternary ammonium aromatic salt admixed with an anionic surfactant, such as sodium xylene sulfonate. Such systems include those set forth in U.S. Patent Publication No. 20040138071, herein incorporated by reference. Typically, the volume ratio of cationic surfactant:anionic surfactant of such viscoelastic surfactants is between from about 1:1 to about 3:1. The alkyl group forming the alkylated moiety can be a $C_{10}$ to $C_{24}$ alkyl group, preferably a $C_{12}$ to a $C_{20}$ alkyl. In a most preferred embodiment, the alkyl group forming the alkylated moiety is a $C_{18}$ alkyl. The aromatic salt is preferably an aromatic salicylate or phthalate. The trialkyl moiety contains preferably from $C_1$ to $C_4$ alkyl groups, most preferably methyl. In a preferred mode, the surfactant is a gelled $C_{18}$ trimethyl quaternary ammonium phthalate or a gelled $C_{18}$ trimethyl quaternary ammonium salicylate.

Such $C_{10}$ to $C_{24}$ alkyl trialkyl quaternary ammonium aromatic salts may be formed by mixing a $C_{10}$ to $C_{24}$, preferably a $C_{18}$, alkyl trialkyl quaternary ammonium chloride with an alkali aromatic salt, such as a sodium salt of either salicylic acid or phthalic acid.

The ULW proppant has an apparent specific gravity (ASG) less than or equal to 2.45, generally is less than or equal to 2.25, typically less than or equal to 2.0, preferably less than or equal to 1.75, more preferably less than or equal to 1.25, most preferably less than or equal to 1.06. Such ULW proppants more easily facilitate the placement of partial monolayers within the formation.

Exemplary ULW proppants for use in the invention include naturally occurring material resistant to deformation, a synthetic polymeric particulate, a porous particulate treated with a non-porous penetrating coating and/or glazing material or a well treating aggregate of an organic lightweight material and a weight modifying agent. Such ULW proppants are disclosed in U.S. Patent Publication No 2008/0087429 A1, herein incorporated by reference.

Further, the ULW proppant may be a polyamide, such as those disclosed in US-2007-0209795 A1, herein incorporated by reference.

Further, the ULW proppant may be metallic spheres, such as those disclosed in U.S. Patent Publication No. 2008/0179057.

The ULW proppant may be any of those deformable particulates set forth in U.S. Patent Publication No. 2008/0182761 and U.S. Pat. No. 7,322,411, both of which are herein incorporated by reference.

Still preferred are synthetic polymers, such as polystyrene beads crosslinked with divinylbenzene. Such beads include those described in U.S. Pat. No. 7,494,711, herein incorporated by reference.

Mixtures of proppants may further be used.

The gaseous fluid to which the viscosified aqueous fluid containing the suspended proppant is added is preferably either an inert gas, such as nitrogen, carbon dioxide, air, natural gas or a combination thereof. Nitrogen is most preferred. The gaseous fluid comprises at least about 90 volume percent of the fluid in the proppant stage.

A pad fluid may precede the introduction of the proppant stage into the formation. The pad fluid is a gaseous fluid and is introduced into the formation at a pressure sufficient to initiate a fracture. The pad fluid is preferably composed entirely of nitrogen or a mixture of nitrogen. The pad fluid may further contain an aqueous fluid, including the viscosified fluid (with or without proppant) set forth above. Where the pad fluid contains a mixture of gaseous fluid and aqueous fluid, the amount of gaseous fluid in the pad fluid mixture is at least 70, preferably at least 90, more preferably at least 95, volume percent. The pad fluid may further contain one or more proppants. Typically, when present, the ASG of the proppant in the pad fluid is less than the ASG of the proppant present in the proppant stage. In a preferred embodiment, the ASG of the proppant in the pad fluid is less than or equal to 2.25.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLE

Example 1

A 95 quality stable foam was prepared by adding a viscosifier to mixing unit 10 of foam flow loop 1 which further contained an aqueous carrier unit. The viscosifier was added to the mixing unit during agitation. The viscosifier and amount added to mixing unit 10 was $C_{18}$ trimethyl quaternary ammonium chloride [3.5 gallons per thousand (gpt)] and 50/50 blend of $C_{18}$ trimethyl quaternary ammonium chloride and sodium xylene sulfonate (10.0 gpt). The fluid was then introduced into triplex Cat pump 20 and pumped through mass flow meter 30. Nitrogen 40 was pressured through mass flow meters and into foam generator 60. The amount of nitrogen in the foam introduced into the foam flow loop was about 95 volume percent.

Figure 2:
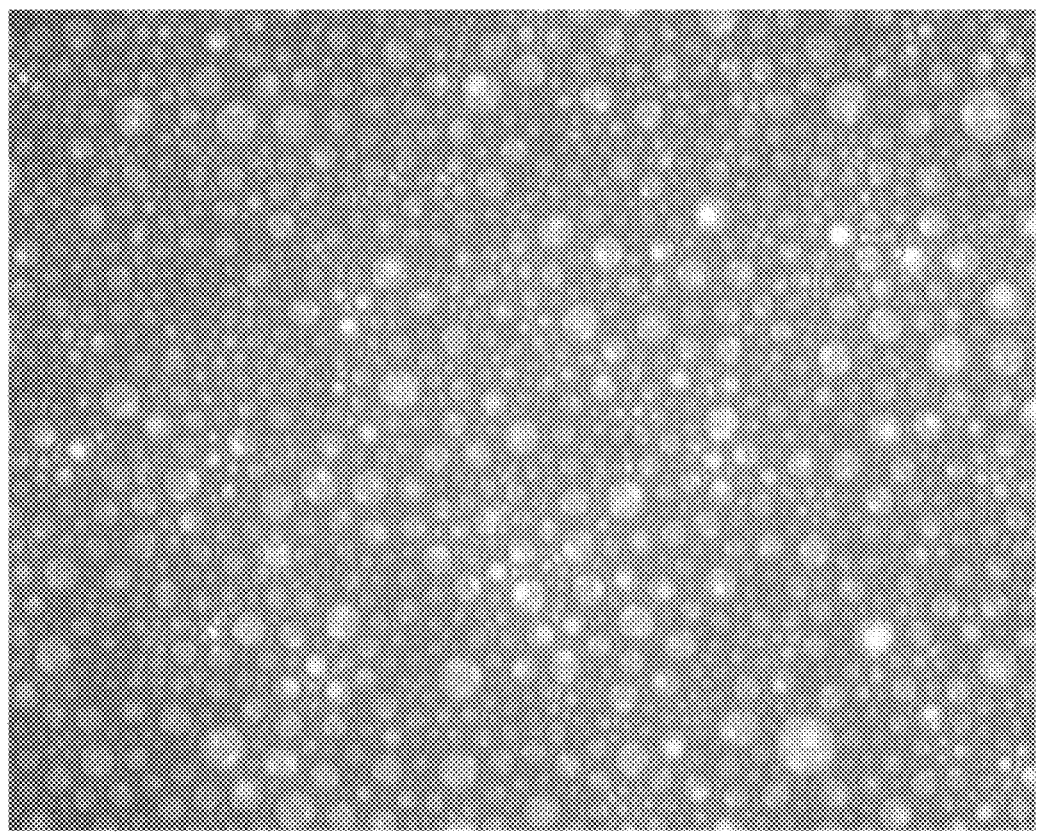
FIG. 2 is a photomicrograph at 5× magnification of the fine textured foam described herein.

Upon exiting the foam generator, the foam entered a 1000 ft. coil of 316 SS tubing submerged in oil bath 70 for about 25-30 minutes. The oil bath temperature was approximately 100° F. The foam then entered capillary tube viscometer 80 after traveling through 1000 feet of coiled tubing. The viscometer consisted of five different tube runs (different ID and tube length) with delta pressure transducers 90a, 90b, 90c, 90d and 90e and one mass flow meter/densimeter 100. With the viscometer filled with foam, 5 delta pressures were measured along with the mass flow rate and density of the foam. After the foam exited the viscometer, it passed through viewing cell 110. The foam then exited waste tank 120 through back pressure regulator 130. The back pressure regulator was used to maintain a constant pressure on the viscometer. The diameter of the bubbles of at least 90% gas volume of the bubbles, as seen through viewing cell 110, was determined to be approximately 0.02 mm by use of bubble analysis software, commercially available as Image Pro Plus from Media Cybernetics, Inc. A photomicrograph, at 4× magnification, of the foam is set forth in FIG. 2.

Example 2

A fracturing treatment was proposed for a Niobrara Chalk formation having a depth to middle perforation of 1,034 ft; a bottom hole static temperature of approximately 73° F., a bottom hole fracture pressure of approximately 724 psi; a surface treating pressure (max) of approximately 751 psi; and a fracture gradient of about 0.70 psi/ft. The desired result was a partial monolayer distribution of proppant upon fracture closure. It was determined that the fracturing treatment would require approximately 10,000 pounds of ultra lightweight proppant. The ULW proppant selected was LiteProp™ 108, thermoplastic ultra lightweight proppant of 14/40 mesh, having an apparent specific gravity of about 1.05, a product of BJ Services Company. The estimated liquid proppant concentration was estimated to be approximately 4 pounds of proppant added per gallon of liquid (ppa). This represents the estimated concentration of proppant needed to accommodate the flow rates of the pumps. Further, the mass of proppant per volume of viscosified liquid fluid was estimated to be 2.77 ppg, the total amount of fluid required for treatment was estimated to be 2500 gallons and the density of viscosified aqueous fluid containing proppant was estimated to be 8.55 lbs/gal.

A 95 quality stable foam was prepared by first suspending LiteProp™ 108 on-site in an aqueous carrier in a mixing unit, the apparent specific gravity ratio of proppant:carrier being about 1.08:1.00, to render a liquid concentration of 4 ppa. A viscosifier was then added to the mixing unit while agitating the slurry. The viscosifier and amount added to the slurry was $C_{18}$ trimethyl quaternary ammonium chloride [3.5 gallons per thousand (gpt) and 50/50 blend of $C_{18}$ trimethyl quaternary ammonium chloride and sodium xylene sulfonate (10.0 gpt). The resultant was proppant suspended in the viscosified aqueous fluid. The proppant suspension was then pumped into the formation while nitrogen was pumped into the wellhead.

Six treatment stages were undertaken at a rate of 25 barrels per minute (bpm). In the first treatment stage, a pad fluid of nitrogen gas and between from about 3 to about gpt of the 50/50 blend of $C_{18}$ trimethyl quaternary ammonium chloride and sodium xylene sulfonate was introduced into the formation. In the stages 2-5, the viscosified proppant suspension was admixed with nitrogen gas at the wellhead, as set forth above. The last treatment stage was a nitrogen flush which did not contain any proppant or surfactant. The parameters of the stages, based on downhole temperatures and pressures, are set forth below in Table I:

TABLE I

| Stage | Downhole Proppant Volume (gal) | Proppant Conc. (ppa) | Proppant Fluid Rate (bpm) | Proppant Rate Dry (ppm) | Proppant Rate Liquid (gpm) | Prop. Vol. Cum. Dry (lbs) | Prop. Vol. Cum. Liquid (gal) | Mitchell Quality*, calc., downhole, % |
|---|---|---|---|---|---|---|---|---|
| 1 | 13,500 | 0 | 1.3 | 0.0 | 0.0 | 0 | 0 | 95.00 |
| 2 | 6,000 | 0.1 | 0.89 | 103.8 | 37.5 | 600 | 217 | 98.00 |
| 3 | 10,000 | 0.2 | 1.77 | 205.4 | 74.2 | 2,600 | 939 | 97.00 |
| 4 | 10,000 | 0.3 | 2.62 | 304.9 | 110.1 | 5,600 | 2022 | 95.00 |
| 5 | 11,000 | 0.4 | 3.45 | 402.2 | 145.2 | 10,000 | 3610 | 93.00 |
| 6 | 672 | 0 | 0 | 0.0 | 0.0 | 10,000 | 2,777 | 100.00 |

*Volume of gas/(volume gas + gel); does not include proppant concentration.

The proppant fluid approximates the number of pounds of proppant required to effectuate the desired downhole concentration of proppant. From the dry rate, the effective liquid rate is determined based on the amount of fluid added.

The treatment set forth rendered a partial monolayer distribution of proppant in the fractures upon closure.

From the foregoing, it will be observed that numerous variations and modifications may be effected without departing from the true spirit and scope of the novel concepts of the invention.

What is claimed is:

1. A method of fracturing a subterranean formation comprising introducing a proppant stage into the subterranean formation, wherein the proppant stage comprises a fine uniform textured foam containing:
   (i) a viscosified aqueous fluid having ultra lightweight (ULW) proppant suspended in the viscosified aqueous fluid; and
   (ii) a gaseous fluid, wherein the amount of gaseous fluid in the fine uniform textured foam is at least about 85 volume percent;
wherein at least 70% gas volume of bubbles of the fine uniform textured foam have a diameter less than or equal to 0.18 mm and further wherein the proppant stage is introduced into the subterranean formation at a pressure sufficient to create or enlarge a fracture.

2. The method of claim 1, wherein the diameter of the bubbles of the fine uniform textured foam is between from about 0.01 to about 0.10 mm.

3. The method of claim 1, wherein the diameter of at least 80% gas volume of the bubbles of the fine uniform textured foam is less than or equal to 0.18 mm.

4. The method of claim 3, wherein the diameter of the bubbles of the fine uniform textured foam is between from about 0.01 to about 0.10 mm.

5. The method of claim 3, wherein the diameter of at least 90% gas volume of the bubbles of the fine uniform textured foam is less than or equal to 0.18 mm.

6. The method of claim 5, wherein the diameter of the bubbles of the fine uniform textured foam is between from about 0.01 to about 0.10 mm.

7. The method of claim 1, wherein the amount of proppant suspended in the viscosified aqueous fluid is that sufficient to create a partial monolayer of proppant in the fracture.

8. The method of claim 1, wherein the ULW proppant has an apparent specific gravity less than or equal to 2.25.

9. The method of claim 8, wherein the apparent specific gravity of the ULW proppant is less than or equal to 1.75.

10. The method of claim 9, wherein the apparent specific gravity of the ULW proppant is less than or equal to 1.25.

11. The method of claim 1, wherein the viscosified aqueous fluid contains a viscoelastic surfactant.

12. The method of claim 1, wherein the gaseous fluid is nitrogen, carbon dioxide or a combination thereof.

13. A method of fracturing a subterranean formation comprising:
   (a) pumping into the formation a proppant stage comprising a fine uniform textured foam wherein at least 70% gas volume of bubbles of the fine uniform textured foam have a diameter less than or equal to 0.18 mm, the fine uniform textured foam prepared by:
      (i) suspending an ultra lightweight (ULW) proppant in a viscosified aqueous fluid; and then
      (ii) combining the viscosified aqueous fluid with a gaseous fluid
   wherein the amount of gaseous fluid in the fine uniform textured foam is at least about 85 volume percent; and
   (b) creating or enlarging a fracture in the subterranean formation.

14. The method of claim 13, wherein the viscosified aqueous fluid comprises between from about 6 to about 55 weight percent of ultra lightweight (ULW) proppant having an apparent specific gravity less than or equal to 2.25.

15. The method of claim 13, further comprising, prior to pumping the proppant stage into the subterranean formation, pumping a pad fluid comprising a gaseous fluid into the formation at a pressure sufficient to initiate a fracture.

16. The method of claim 15, wherein the pad fluid further contains a proppant.

17. The method of claim 16, wherein the pad fluid comprises a gaseous fluid and an aqueous fluid.

18. The method of claim 13, wherein the amount of proppant suspended in the viscosified aqueous fluid is that sufficient to create a partial monolayer of proppant in the fracture.

19. The method of claim 13, wherein the diameter of at least 90% gas volume of the bubbles of the fine uniform textured foam is less than or equal to 0.18 mm.

20. The method of claim 13, wherein the diameter of between about 70 to about 90% gas volume of the bubbles is from about 0.01 to about 0.10 mm.

21. The method of claim 13, wherein the viscosified aqueous fluid is added to the gaseous fluid in step (a) (ii).

22. The method of claim 13, wherein the gaseous fluid is added to the viscosified aqueous fluid in step (a) (ii).

23. The method of claim 13, wherein the viscosified aqueous fluid contains a viscoelastic surfactant.

24. A method of fracturing a subterranean formation comprising introducing a proppant stage into a fracture, wherein the proppant stage consists of a fine textured foam comprising a gaseous fluid and an ultra lightweight (ULW) proppant having an apparent specific gravity (ASG) less than or equal to 2.25 suspended in an aqueous system viscosified with a viscoelastic surfactant and wherein the amount of gaseous fluid in the fine textured foam is greater than 90 volume percent and further wherein at least 70% gas volume of bubbles comprising the foam have a diameter that is less than or equal to 0.18 mm.

25. The method of claim 24, wherein between about 50 to about 90% gas volume of the bubbles have a diameter from about 0.01 to about 0.10 mm.

26. The method of claim 24, wherein the gaseous fluid comprises at least 95 volume percent of the fluid in the proppant stage.

* * * * *